United States Patent [19]
Holt et al.

[11] Patent Number: 5,394,551
[45] Date of Patent: Feb. 28, 1995

[54] SEMAPHORE MECHANISM FOR A DATA PROCESSING SYSTEM

[75] Inventors: Nicholas P. Holt, Cheshire; Michael Fields, Lancashire; Mark N. Fullerton, Derbyshire; Andrew J. Knowles, Cheshire, all of United Kingdom

[73] Assignee: International Computers Limited, London, United Kingdom

[21] Appl. No.: 954,575

[22] Filed: Sep. 30, 1992

[30] Foreign Application Priority Data

Nov. 1, 1991 [GB] United Kingdom ............... 9123264

[51] Int. Cl.⁶ ............................................. G06F 15/00
[52] U.S. Cl. ........................... 395/725; 364/DIG. 1; 364/228.1; 364/229; 364/240; 364/242.94; 364/243; 364/255.7; 364/940; 364/940.2; 364/940.71; 364/940.91; 364/940.92; 364/DIG. 2
[58] Field of Search .............. 395/725, 325, 425, 650, 395/800, 200

[56] References Cited

U.S. PATENT DOCUMENTS

| | | | |
|---|---|---|---|
| 4,145,739 | 3/1979 | Dunning et al. | 395/800 |
| 4,316,245 | 2/1982 | Luu et al. | 395/650 |
| 4,380,798 | 4/1983 | Shannon et al. | 395/725 |
| 4,395,757 | 7/1983 | Bienvenu et al. | 395/650 |
| 4,412,285 | 10/1983 | Neches et al. | 395/650 |
| 4,594,657 | 6/1986 | Byrns | 395/725 |
| 4,754,398 | 6/1988 | Pribnow | 395/200 |
| 4,964,040 | 10/1990 | Wilcox | 395/425 |
| 4,965,718 | 10/1990 | George et al. | 395/425 |
| 5,050,072 | 9/1991 | Earnshaw et al. | 395/325 |
| 5,123,106 | 6/1992 | Otsuki et al. | 395/725 |
| 5,138,713 | 8/1992 | Loten | 395/725 |
| 5,179,665 | 1/1993 | Roslund et al. | 395/250 |
| 5,276,886 | 1/1994 | Dror | 395/725 |

FOREIGN PATENT DOCUMENTS

| | | |
|---|---|---|
| 0013301 | 7/1980 | European Pat. Off. . |
| 0351556 | 1/1990 | European Pat. Off. . |

OTHER PUBLICATIONS

Ripps, "Semaphores and controlled shared variables", Electrical Design News, vol. 36, No. 4, Feb. 4, 1991, pp. 85–90.

Primary Examiner—Jack B. Harvey
Assistant Examiner—Ayaz R. Sheikh
Attorney, Agent, or Firm—Lee, Mann, Smith, McWilliams, Sweeney & Ohlson

[57] ABSTRACT

In a data processing system a number of processing nodes share resources. Access to the shared resources is controlled by semaphores, each node having a local copy of all the semaphores. Nodes may acquire ownership of semaphores. When a node requires a semaphore operation on a particular semaphore, a semaphore message is broadcast to all the nodes instructing them to perform the semaphore operation on their local copies of the semaphore. If the semaphore is unowned, the node must suspend the semaphore operation until the message returns, so as to ensure correct chronology for the semaphore operation. If, however, the semaphore owned by this node, the node can perform the semaphore operation without waiting for the message to return. This speeds up the semaphore mechanism. If the semaphore is owned by another node, that other node relinquishes ownership so that the semaphore operation can be performed.

7 Claims, 6 Drawing Sheets

SEMAPHORE MECHANISM FOR A DATA PROCESSING SYSTEM

BACKGROUND TO THE INVENTION

This invention relates to semaphore mechanisms for data processing systems.

More specifically, the invention is concerned with a data processing system having a number of processing nodes, interconnected by a communication network, wherein the nodes have access to shared resources such as shared memory.

A semaphore mechanism is a means for ensuring that only one processing node can access a shared resource at any given time. In one known form of semaphore mechanism, each shared resource (e.g. each area of the shared memory) has a semaphore location associated with it. Whenever a node wishes to access a shared resource, it first increments and tests the associated semaphore location, to find out whether another node is already accessing that resource. Conversely, when the node has completed its access to a shared resource, it tests and decrements the appropriate semaphore location. Each node holds local copies of all the semaphore locations, and to ensure that all these copies are kept consistent, each semaphore action requires sending a semaphore message over the network to initiate the required operation on each local copy of the semaphore location.

In such a system, it is necessary to provide some way of synchronising semaphore operations, to ensure that each node applies all such operations in the same chronological sequence, regardless of which node originated them. One way of achieving this is to broadcast the semaphore messages to all the nodes in the system, including the originating nodes. These messages are distributed to the nodes in such a way that all the nodes receive the messages in the same sequence. This sequence then defines a unique chronology for the semaphore operations.

A problem with this is that a process running in a node must be suspended each time it initiates a semaphore operation, until the associated semaphore message has been "turned round" (i.e. received back from the network) so that the process can be sure of the correct chronology for the operation. This can result in significant delays in performing the semaphore operations.

The object of the present invention is to provide a way of reducing the suspension time associated with semaphore operations, and hence to speed up the operation of the system.

SUMMARY OF THE INVENTION

According to the invention there is provided a data processing system comprising:

(a) a plurality of processing nodes,
(b) a communications network interconnecting the nodes to allow the nodes to send messages over the network, the messages being delivered to all the nodes in the same chronological sequence,
(c) a plurality of shared resources, shared by all the nodes,
(d) a plurality of semaphores for controlling access to respective shared resources, each node having a local copy of all the semaphores,
(e) means for defining ownership states for the semaphores whereby each semaphore may be unowned, or owned by a particular node,
(f) means in each node, responsive to a request for a semaphore operation on an unowned semaphore, for sending a semaphore message over the network instructing all the nodes to perform the semaphore operation on their local copies of the semaphore, the semaphore operation being suspended in this node until the semaphore message has been returned from the network, and
(g) means in each node, responsive to a request for a semaphore operation on a semaphore owned by this node, for sending a semaphore message over the network instructing all the nodes to perform the semaphore operation on their local copies of the semaphore, this node being permitted to proceed with the semaphore operation without waiting for the semaphore message to be returned from the network.

It will be seen that, as a result, the number of times a node has to suspend while waiting for a semaphore message to be synchronised is greatly reduced. An additional delay will occur when two nodes attempt to use a particular semaphore at the same time, but in practice this situation arises relatively infrequently and hence this is a relatively small overhead problem.

DESCRIPTION OF AN EMBODIMENT OF THE INVENTION

One data processing system in accordance with the invention will now be described by way of example with reference to the accompanying drawings.

Figure 1:
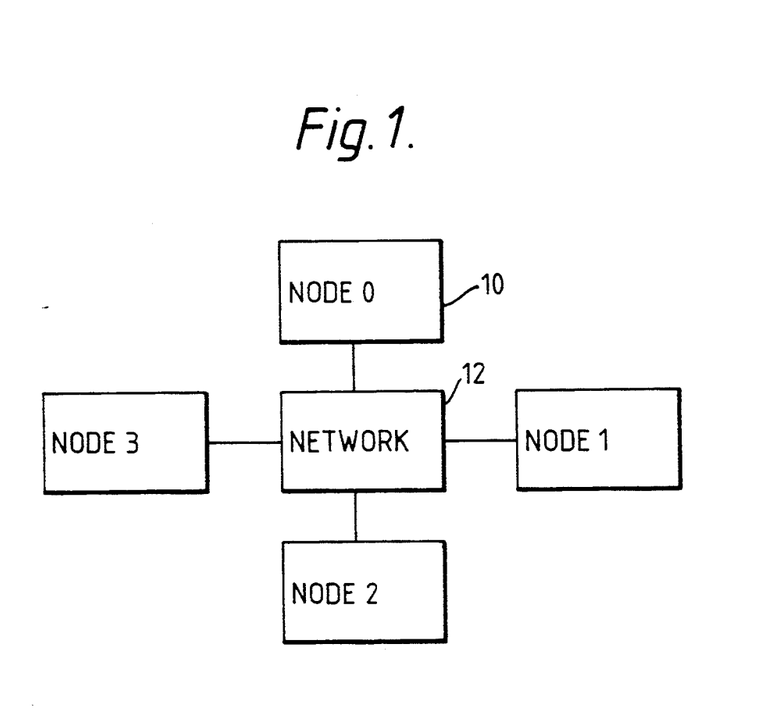
FIG. 1 is a block diagram of a data processing system embodying the invention.

Referring to FIG. 1, the data processing system comprises a plurality of processing nodes 10, interconnected by a communications network 12. Each node can send messages over the network to the other nodes. The network broadcasts each message to all the nodes, including the node that originated the message. The network is a star coupler, which ensures that all the nodes receive the messages in the same sequence. This sequence defines a unique chronology for the messages.

Figure 2:
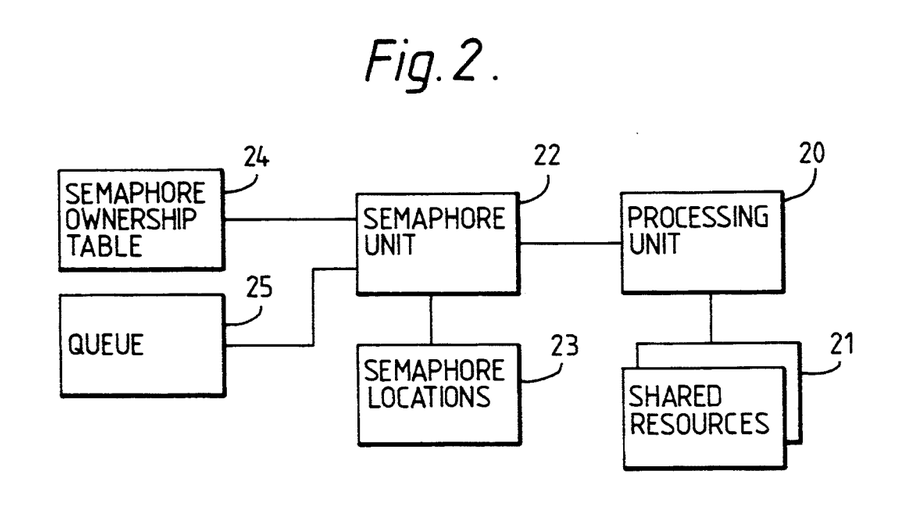
FIG. 2 is a block diagram showing a processing node of the system in more detail.

Referring to FIG. 2, each node includes a processing unit 20 for scheduling and executing a number of concurrent processes. The processing unit may be conventional and so will not be described in further detail.

The processing unit 20 in each node has access to a number of shared resources 21, i.e. resources that are shared with other nodes. These resources may, for example, comprise areas of shared memory.

Each node includes a semaphore unit 22 which controls access to the shared resources 21, using a set of semaphore locations 23, a semaphore ownership table 24 and a semaphore queue 25. Each node has its own local copies of the semaphore locations and the semaphore ownership table, and has its own semaphore queue.

Each shared resource has a particular semaphore location associated with it. If the resource is free, the semaphore location has the value −1.

Whenever a process wishes to gain access to a shared resource, it issues an INCT (increment and test) request. The semaphore location associated with that resource is then incremented, and its value returned. If the returned semaphore value is 0, the operation is successful, and the process may access the shared resource. If the returned semaphore value is greater than 0, the operation is unsuccessful.

When the process has finished using the shared resource, it issues a TDEC (test and decrement) request. This causes the value of the semaphore location to be returned, and the location is then decremented. If the returned value is 0, this means that the shared resource is now free, and is available for access by another process.

Both of these operations (INCT and TDEC) are atomic, in the sense that they may not be interrupted by another operation.

The semaphore ownership table 24 consists of a number of sections, one for each node. Each section has a fixed number of slots, each of which can hold an entry, defining the ownership state of a particular semaphore. Each entry in the ownership table comprises the following fields:

ADDRESS: the virtual address of the semaphore location to which the entry relates.
STATE: the ownership state of the semaphore location (see below).

Each semaphore location has one of the following ownership states: IDLE, OWNED, DISCARD, OTHER-OWNED, and QUEUED. The current state of a semaphore is indicated by the STATE field in the corresponding entry in the ownership table. The exception to this is the IDLE state, which represents the state where there is no entry for the semaphore in the ownership table.

The meanings of these ownership states are as follows:
IDLE: the semaphore is not owned by any node.
OWNED: the semaphore is owned by the local node.
DISCARD: ownership of the semaphore has been relinquished.
OTHER-OWNED: the semaphore is owned by a remote node.
QUEUED: the semaphore has one or more suspended semaphore operations in the queue 25.

The semaphore queue 25 is a list of suspended semaphore operations. As will be described, whenever a node requires to perform a semaphore operation on a semaphore currently owned by another node, that operation is placed in the queue. The operation is applied when the owning node relinquishes ownership.

Each entry in the queue comprises the following fields:
FUNCTION: the required semaphore operation (INCT or TDEC).
ADDRESS: the virtual address of the semaphore location.
VALUE: the expected value of the semaphore location (i.e. the value of the semaphore when the semaphore message was turned round).

The semaphore units 22 in the different nodes communicate with each other by means of semaphore messages sent over the network. Each message comprises the following fields:
FUNCTION: the type of message (see below).
ORIGIN: the identity of the source node.
ADDRESS: the virtual address of the semaphore location to which the message relates.
READ-VALUE: the value of the semaphore location read by the originating node before sending the message.

The FUNCTION field represents one of the following functions:
INCT: increment and test specified semaphore.
TDEC: test and decrement a specified semaphore.
APPLIED-INCT: as for INCT, except that the INCT has already been applied by the originating node.
APPLIED-TDEC: as for TDEC, except that the TDEC has already been applied by the originating node.
DISCARD: used by the owner of a semaphore to relinquish ownership.

It should be noted that the READ-VALUE field is not required for DISCARD messages.

GENERAL RULES

The general rules of operation of the semaphore mechanism are as follows.

(1) Message ordering

All the messages pertaining to semaphore operations (Semops) are globally ordered. Thus a message will be received in all nodes at the same point in the sequence.

(2) Assumption of Ownership

A node may only assume ownership after issuing an INCT operation. It must then suspend the issuing process. Once the INCT operation has been turned round by the network, the node examines the ownership table. If no other node has earlier assumed ownership then the originating node may do so. Other nodes upon encountering the INCT will have received the same sequence of earlier messages and are thus capable of reproducing the originating node's decision and updating their local copies of the table accordingly. A node thus assumes ownership at a particular point in the sequence of messages.

(3) Relinquishing Ownership

A node may relinquish ownership of a semaphore owned by it, by sending either TDEC or a DISCARD message.

A node relinquishes ownership at a particular point in the sequence. The node which issues the relinquish regards it as no longer owned as soon as it issues the TDEC or DISCARD message. Ownership is not, however, fully discarded until the message has been turned round by the network.

(4) Discarding when Ownership Table Full

The ownership table in each node is obviously finite. The case therefore occurs that the table is full but the node wishes to issue another INCT operation. In this case the node must choose one of its owned semaphores and relinquish it (i.e. issue a DISCARD operation on it), thus freeing a slot of the ownership table. In order that there will always be at least one slot which can be discarded, the table must be larger than the total number of semaphores which can be outstanding at one time, for example, if the system can have only one semaphore per node outstanding at once, a minimum of two slots are required for each node.

(5) Alien Semops

When a node receives a semop from an alien node to a location which it owns, it must issue a DISCARD message to allow the alien node to complete its operation. It must not ignore the request in the expectation of later sending a TDEC message out. It is however, permitted to wait for a short time before issuing a DISCARD, in the hope that a TDEC will be generated.

(6) Gain Ownership on INCT from −1 to 0 only

In order to improve the match between the control of a shared resource and the ownership of the semaphore that manages the resource, it is desirable to allow a node to gain ownership of a semaphore only when control of the resource is gained. As the gaining of control is under software control it is impossible to produce a perfect match. However, if control is gained only when a semaphore location is incremented from −1 to 0, this gives a good approximation to the ideal behaviour.

OUTGOING INCT

Figure 3:
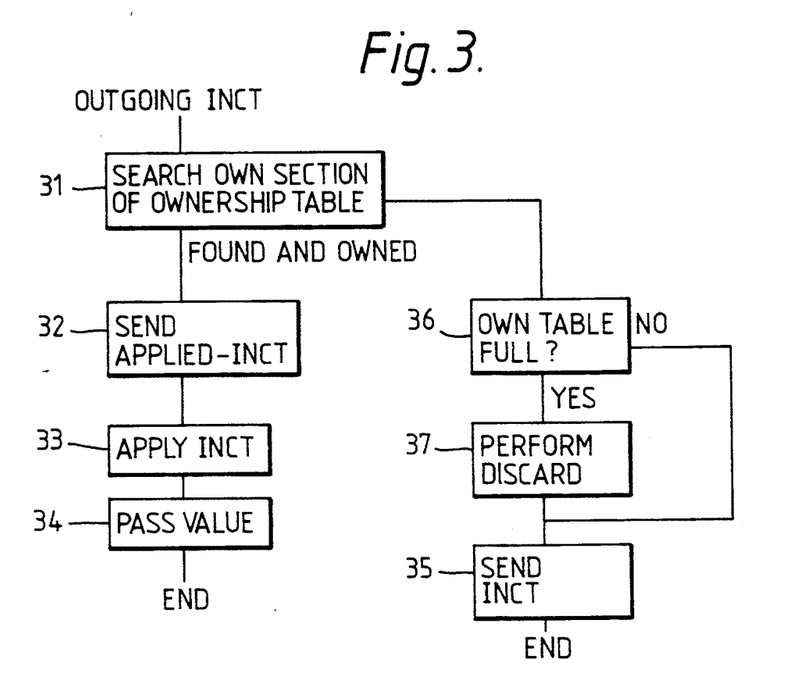
FIGS. 3–12 are flow diagrams illustrating the semaphore mechanism with each node.

Referring to FIG. 3, this shows the action of the semaphore unit 22 when it receives an INCT request from a process running on the local processing unit.

The INCT request includes as parameters the virtual address of the semaphore location to which it relates and also the current value of that location. The process that issued the request is suspended, waiting for the semaphore operation to be synchronised.

The semaphore unit first searches (31) its own section of the ownership table 24 (i.e. the section relating to the local node) looking for an entry in the OWNED state.

If such an entry is found, this means that the semaphore is already owned by this node, and so the node can proceed to perform the semaphore operation without waiting for the operation to be sychronised. An APPLIED-INCT message is sent (32) over the network, this message including the semaphore address and value as supplied with the INCT request. The INCT operation is applied (33) to the local copy of the semaphore and the returned value is passed (34) to the processing unit. The process that initiated the INCT can then be de-suspended.

If, on the other hand, the semaphore i.e. not owned by this node, an INCT message is sent (35) over the network, this message containing the semaphore address and value as supplied by the INCT request. The process that initiated the INCT request remains suspended, waiting for the message to be turned around.

As will be described, when a node sends an INCT message, it may acquire ownership of the semaphore, if that semaphore is not already owned by another node. Therefore, before sending the INCT message, the semaphore unit first checks (36) the semaphore ownership table to determine whether there are any free entries in its own section of the table. If this section of the table is full, one of the existing entries is selected and a DISCARD message is sent (37) over the network informing all the nodes that this entry is to be discarded. The state of the selected entry is set to DISCARD.

OUTGOING TDEC

Figure 4:
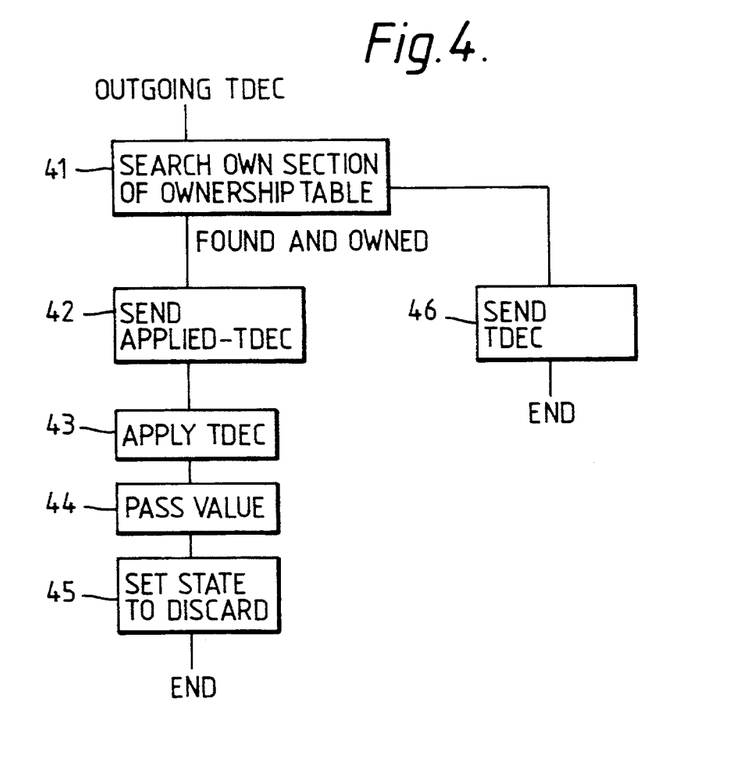

Referring to FIG. 4, this shows the action of the semaphore unit when it receives a TDEC request from a process running on the local processing unit.

The TDEC request includes as parameters the virtual address of the semaphore location to which it relates and also the current value of that location. The process that issued the request is suspended, waiting for the semaphore operation to be synchronised.

The semaphore unit first searches (41) its own section of the ownership table, looking for an entry in the OWNED state.

If such an entry is found, this means that the semaphore is already owned by this node, and so the node can proceed to perform the semaphore operation without waiting for the operation to be synchronised. An APPLIED TDEC message is sent (42) over the network, this message including the semaphore address and value as supplied with the TDEC request. The TDEC operation is applied (43) to the local copy of the semaphore, and the returned value is passed (44) to the processing unit. The process that initiated the TDEC can then be de-suspended. The table entry is set (45) to DISCARD to indicate that this node has now relinquished ownership of the semaphore.

If, on the other hand, the semaphore is not owned by this node, a TDEC message is sent (46) over the network, this message containing the semaphore address and value, as supplied by the TDEC request.

INCOMING OWN INCT

Figure 5:
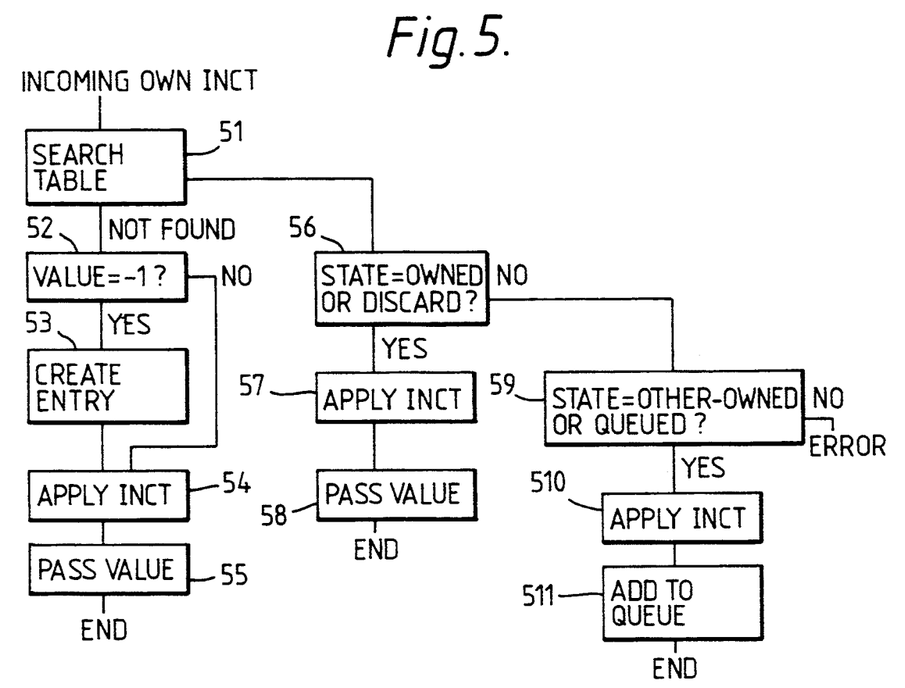

Referring to FIG. 5, this shows the operation of the semaphore unit when the node receives an INCT message from the network, originating from itself.

The semaphore unit first searches (51) the whole of its ownership table, looking for an entry relating to the semaphore specified in the INCT message.

If no entry can found (i.e. the semaphore is IDLE), the semaphore value in the INCT message is tested (52) and, if it is equal to −1, the node assumes ownership of the semaphore, by creating (53) an entry in its own section of the ownership table, setting the state of this entry to OWNED. The INCT operation is then applied (54) to the local copy of the semaphore, and the returned value is passed (55) to the processing unit. The process that initiated the INCT can then be de-suspended.

If an OWNED or DISCARD entry is found (56), the INCT is applied (57) to the local copy of the semaphore and the returned value is passed (58) to the processing unit, so that the process can be de-suspended.

If an OTHER-OWNED or QUEUED entry is found (59), the INCT is applied (510) to the local copy of the semaphore, but the returned value is not passed to the processor. Instead, an INCT entry is added (511) to the local queue, this entry containing the semaphore address and returned value. If the semaphore is OTHER-OWNED, its state is changed to QUEUED.

INCOMING OWN TDEC

Figure 6:
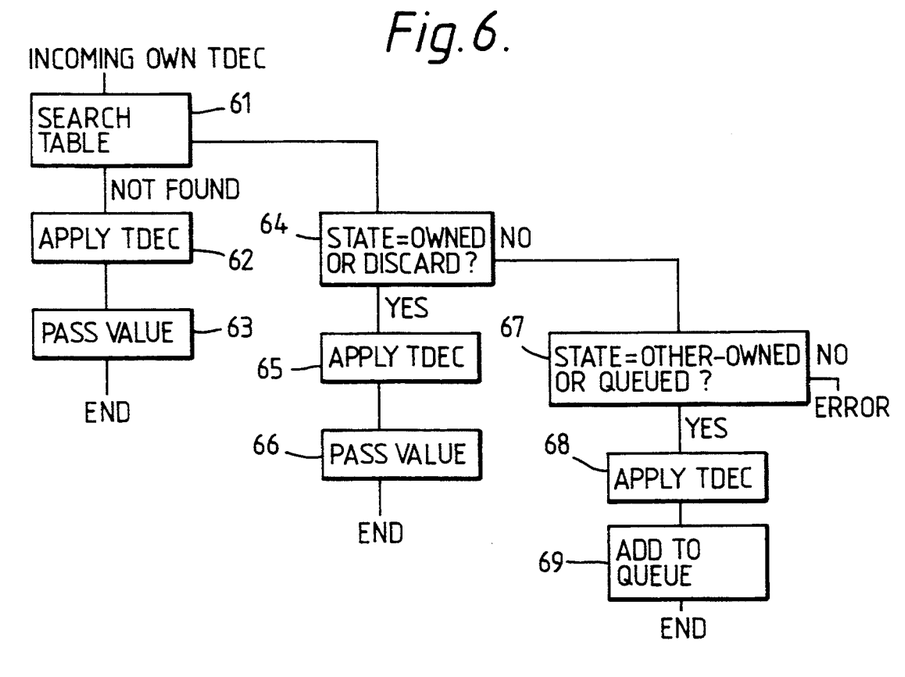

Referring to FIG. 6, this shows the operation of the semaphore unit when the node receives a TDEC message from the network, originating from itself.

The semaphore unit first searches (61) the whole of its ownership table, looking for an entry relating to the semaphore specified in the TDEC message.

If no entry can be found (i.e. the semaphore is IDLE), the TDEC operation is applied (62) to the local copy of the semaphore, and the returned value is passed (63) to the processing unit. The process that initiated the TDEC can then be de-suspended.

If an OWNED or DISCARD entry is found (64), the TDEC is applied (65) to the local copy of the semaphore and the returned value is passed (66) to the processing unit, so that the process can be de-suspended.

If an OTHER-OWNED or QUEUED entry is found (67), the TDEC is applied (68) to the local copy of the semaphore, and a TDEC entry is added (69) to the local queue, this entry containing the semaphore address and returned value. If the semaphore is OTHER-OWNED, its state is changed to QUEUED.

INCOMING OWN APPLIED-INCT

When a node receives an incoming APPLIED-INCT message originating from itself, the semaphore unit acts as follows. The semaphore unit first searches its own section of the ownership table, looking for an entry relating to the specified semaphore. If an entry in the DISCARD or OWNED state is found, no action is required. Otherwise, an error is indicated.

INCOMING OWN APPLIED-TDEC OR DISCARD

Figure 7:
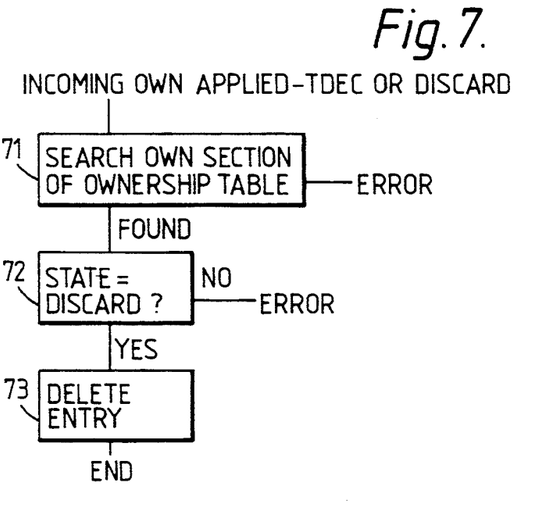

Referring to FIG. 7, this shows the action of the semaphore unit when the node receives an APPLIED-TDEC or DISCARD message that originated from itself.

The semaphore unit first searches (71) its own section of the ownership table, looking for an entry for the specified semaphore. If an entry in the DISCARD state is found (72), that entry is deleted (73) so as to reset the state of the semaphore to IDLE). Otherwise, an error is indicated.

INCOMING ALIEN INCT

Figure 8:
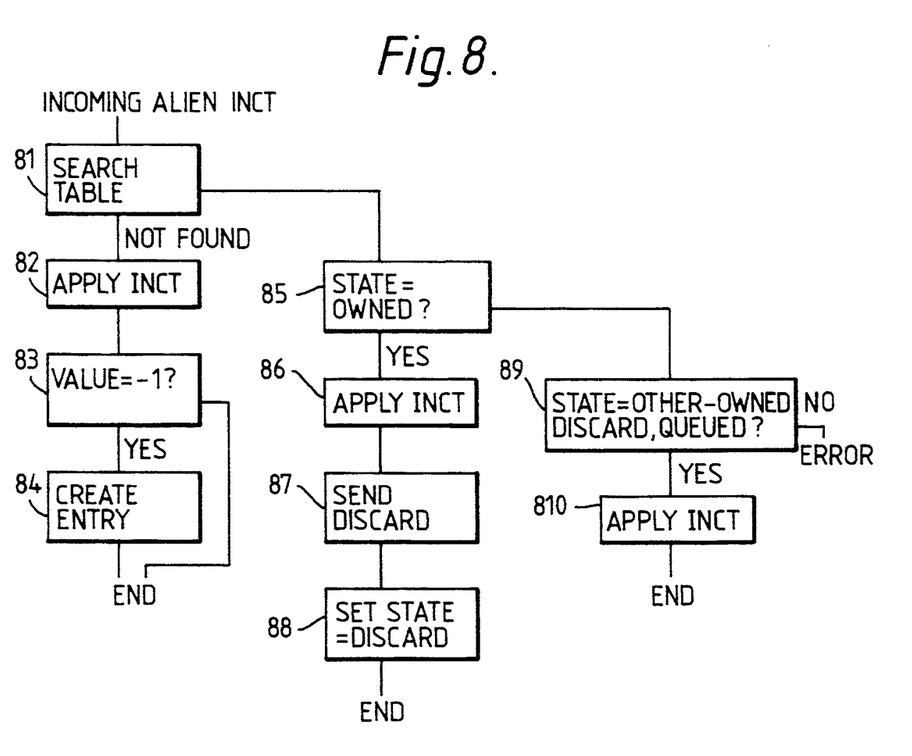

Referring to FIG. 8, this shows the action of the semaphore unit when it receives an INCT message originating from another node.

The semaphore unit first searches (81) the whole of the ownership table looking for an entry relating to the specified semaphore.

If no entry is found (i.e. the semaphore is IDLE), the INCT operation is applied (82) to the local copy of the semaphore. Also the semaphore value contained in the message is tested (83) and, if it is $-1$, an entry is created (84) in the section of the ownership table corresponding to the node that originated the message, with state OTHER-OWNED to indicate that this semaphore is now owned by that node.

If an OWNED entry is found (85), the INCT operation is applied (86) to the local copy of the semaphore. A DISCARD message is then sent (87) and the state of the entry is set (88) to DISCARD.

If a DISCARD, OTHER-OWNED or QUEUED entry is found (89), the INCT operation is applied (810) to the local copy of the semaphore.

INCOMING ALIEN TDEC

Figure 9:
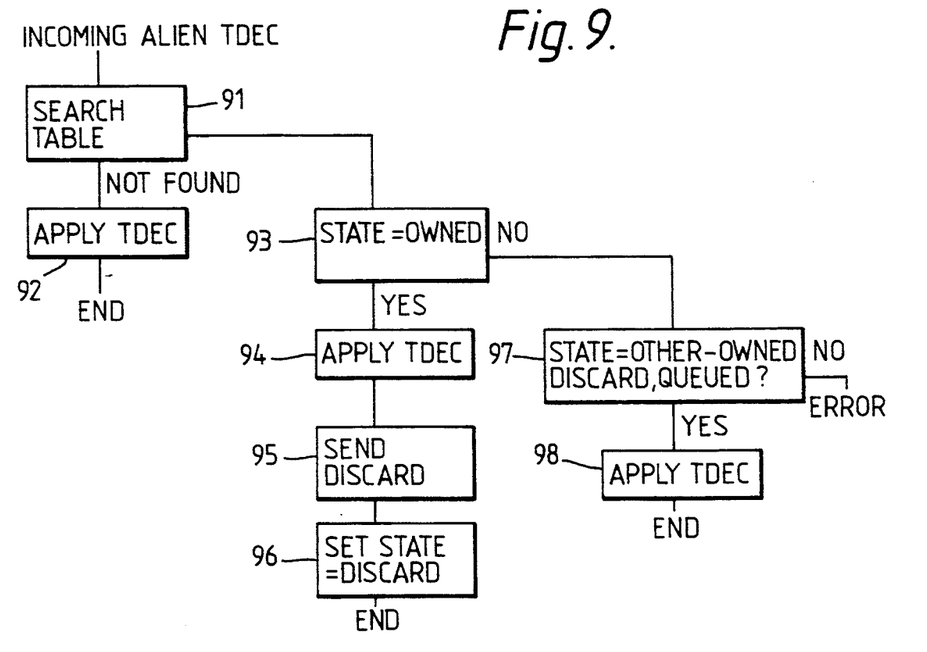

Referring to FIG. 9, this shows the action of the semaphore unit when it receives a TDEC message originating from another node.

The semaphore unit first searches (91) the whole of the ownership table looking for an entry relating to the specified semaphore.

If no entry is found (i.e. the semaphore is IDLE), then the TDEC operation is applied (92) to the local copy of the semaphore.

If an OWNED entry is found (93), the TDEC operation is applied (94) to the local copy of the semaphore. A DISCARD message is then sent (95), and the state of the entry is set (96) to DISCARD.

If a DISCARD, OTHER-OWNED or QUEUED entry is found (97), the TDEC operation is applied (98) to the local copy of the semaphore.

INCOMING ALIEN APPLIED-INCT

Figure 10:
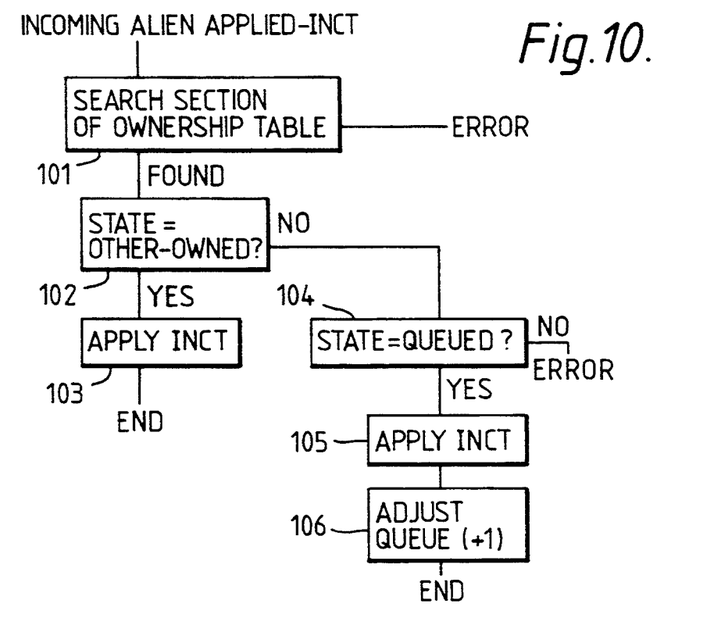

Referring to FIG. 10, this shows the action of the semaphore unit when it receives an APPLIED-INCT message originating from another node.

The semaphore unit first searches (101) the section of the ownership table relating to the node that originated the message, looking for an entry relating to the specified semaphore. If no entry is found then an error is indicated.

If an OTHER-OWNED entry is found (102), then the INCT operation is applied (103) to local copy of the semaphore.

If a QUEUED entry is found (104), then the INCT operation is applied (105) to the local copy of the semaphore. Each entry in the local queue associated with this particular semaphore is then adjusted (106) by adding 1 to its value field.

If the semaphore is in any other state, an error is indicated.

INCOMING ALIEN APPLIED-TDEC

Figure 11:
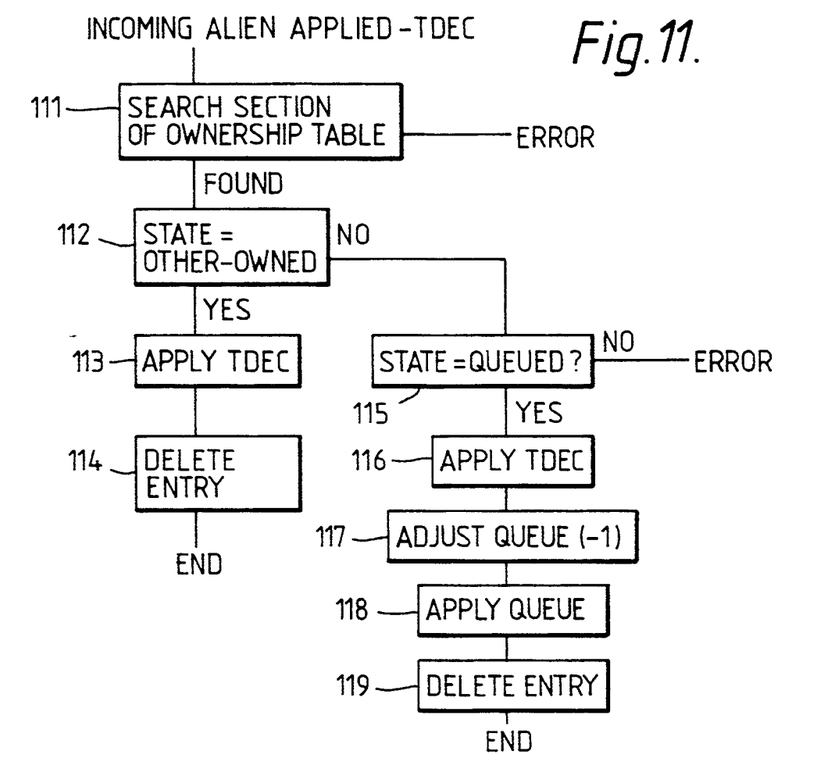

Referring to FIG. 11, this shows the action of the semaphore unit when it receives an APPLIED-TDEC message originating from another node.

The semaphore unit first searches (111) the section of the ownership table relating to the node that originated the message, looking for an entry relating to the specified semaphore. If no entry is found, an error is indicated.

If an OTHER-OWNED entry is found (112), the TDEC operation is applied (113) to the local copy of the semaphore, and the entry is deleted (114) so as to set the semaphore to IDLE.

If a QUEUED entry is found (115), the TDEC operation is applied (116) to the local copy of the semaphore. Each entry in the local queue associated with this semaphore is then adjusted (117) by subtracting 1 from its value field. The queue is then applied (118) by passing each entry associated with this semaphore to the processing unit. All these queue entries are then deleted from the queue, and the remaining entries are shifted down to fill up the gaps. Finally, the entry in the ownership table is deleted (119) so as to set the semaphore to IDLE.

INCOMING ALIEN DISCARD

Figure 12:
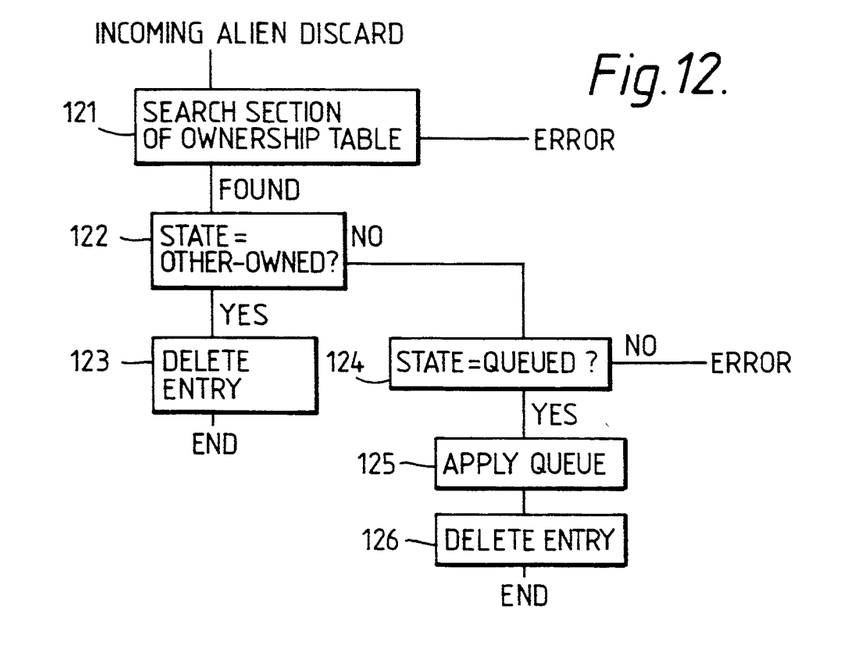

Referring to FIG. 12 this shows the action of the semaphore unit then it receives a DISCARD message originating from another node.

The semaphore unit first searches (121) the section of the ownership table relating to the node that originated the message, looking for an entry relating to the specified semaphore. If no entry is found, an error is indicated.

If an OTHER-OWNED entry is found (122), this entry is deleted (123) so as to set the semaphore to IDLE.

If a QUEUED entry is found (124), the local queue is applied (125) by passing each entry in this queue associated with this semaphore to the processing unit. All these entries are deleted from the queue and the remaining entries are shifted down to fill up the gaps. Finally, the entry in the ownership table is deleted (126) so as to set the semaphore to IDLE.

EXAMPLE OF OPERATION (1)

The case will first be considered where a process running in node 0 requires to access a shared resource, where the semaphore for that resource is not currently owned by any node (i.e. the semaphore is IDLE).

The process issues an INCT request to the semaphore unit 22 and is then suspended. Referring to FIG. 3, the semaphore unit does not find an entry for this semaphore, and so sends an INCT message over the network to all the nodes.

As shown in FIG. 8, when this INCT message is received at each other node the INCT is applied to the local copy of the semaphore, and an OTER-OWNED entry is created in the ownership table in that node, indicating that the semaphore is now owned by node 0.

As shown in FIG. 5, when the INCT message is received at node 0, an OWNED entry is created in the ownership table, indicating that the semaphore is now owned by this node. The INCT is then applied to the local copy of the semaphore and the returned value is passed to the processor. The suspended process can then be de-suspended and can access the shared resource.

When the process has completed its access to the shared resource, it issues a TDEC request and is suspended again. Referring to FIG. 4, the semaphore unit finds that the semaphore is already owned by this node, and so can immediately apply the TDEC operation to the local copy of the semaphore, passing the returned value to the processor. The suspended process can therefore be immediately de-suspended, without waiting for the TDEC message to be turned around. Thus, the semaphore operation is effectively applied ahead of its true chronological order. The semaphore unit also sends an APPLIED-TDEC message over the network and sets the state of the entry in the ownership table to DISCARD.

Referring to FIG. 11, when the APPLIED-TDEC message is received in the other nodes, the semaphore unit in each of these nodes finds that the semaphore is in the OTHER-OWNED state. It therefore applies the TDEC to its local copy of the semaphore and deletes the entry in the ownership table (i.e. sets the semaphore to IDLE).

Referring to FIG. 7, when the APPLIED-TDEC message is received by node 0, the semaphore unit in that node finds that the semaphore is in the DISCARD state. It therefore deletes the entry in the ownership table, returning the semaphore to the IDLE state.

EXAMPLE OF THE OPERATION (2)

Consider now the case where a process running in node 0 requires to access a shared resource, where the semaphore for that resource is already owned by node 1.

As before, the process issues an INCT request, and is suspended, and the semaphore unit sends an INCT message (FIG. 3).

Referring to FIG. 8, when the INCT message is received at node 1, the semaphore unit in node 1 finds that the semaphore is OWNED, i.e. owned by node 1. It therefore applies the INCT to the local copy of the semaphore, and then sends a DISCARD message, setting the ownership state of the semaphore to DISCARD. Thus, node 1 relinquishes ownership of the semaphore to allow node 0 to perform its semaphore operation.

Referring to FIG. 5, when the INCT message is received at node 0, the semaphore unit in node 0 finds that the semaphore is OTHER-OWNED. It therefore applies the INCT to the local copy of the semaphore, and puts the returned value into the local queue, setting the ownership state of the semaphore to QUEUED.

Referring to FIG. 12, when the DISCARD message from node 1 arrives at node 0, the semaphore unit finds that the semaphore is QUEUED. It therefore applies the queue, passing the queued value to the processor so that the process can now be de-suspended. Finally, it deletes the local ownership table entry, returning the semaphore to the IDLE state.

When the DISCARD message arrives at node 1, the local ownership table entry is deleted.

We claim:

1. A data processing system comprising:
   (a) a plurality of processing nodes,
   (b) a communications network interconnecting the nodes to allow the nodes to send messages over said communications network, the messages being delivered to all the nodes in the same chronological sequence,
   (c) a plurality of shared resources, shared by all the nodes,
   (d) a plurality of semaphores for controlling access to respective shared resources, each node having a local copy of all the semaphores,
   (e) each node including a semaphore ownership table for defining ownership states for the semaphores whereby each semaphore may be unowned (i.e. not owned by any node), or owned by a particular node,
   (f) means in each node, responsive to a request for a semaphore operation on an unowned semaphore, for sending a semaphore message over said communications network instructing all the nodes to perform the semaphore operation on their local copies of the semaphore, and for then suspending the semaphore operation in this node until the semaphore message has been returned from said communications network,
   (g) means in each node, responsive to a request for a semaphore operation on a semaphore owned by this node, for sending a semaphore message over said communications network instructing all the nodes to perform the semaphore operation on their local copies of the semaphore, and for then permitting this node to proceed with the semaphore operation without waiting for the semaphore message to be returned from said communications network and
   (h) means in each node, responsive to a request for a semaphore operation on a semaphore owned by another node, for sending a semaphore message over said communications network instructing all the nodes to perform the semaphore operation on their local copies of the semaphore, and for then suspending the semaphore operation until permission to proceed is received from that other node.

2. The system according to claim 1 wherein each node includes a queue for queuing values returned by semaphore operations on semaphores owned by other nodes.

3. The system according to claim 1 wherein each node relinquishes ownership of a semaphore owned by it when it performs a semaphore operation to free the associated shared resource, or when it receives a semaphore message relating to that semaphore from another node.

4. The system according to claim 1 wherein the means for defining ownership states for semaphores comprises an ownership table, each node having a local copy of the ownership table.

5. A system according to claim 1 wherein each node includes means responsive to receipt of a semaphore message from another node relating to a locally-owned semaphore, for sending a message over the network indicating that ownership of said locally-owned semaphore is relinquished.

6. A system according to claim 1 wherein each node includes means responsive to receipt of a semaphore message relating to an unowned semaphore, for updating said semaphore ownership table to indicate that said unowned semaphore is now owned by the node that initiated said semaphore message.

7. A method of operating a data processing system comprising:
- (a) a plurality of processing nodes,
- (b) a communications network interconnecting the nodes to allow the nodes to send messages over said communications network, the messages being delivered to all the nodes in the chronological sequence, and
- (c) a plurality of shared resources, shared by all the nodes, wherein the method comprises the steps:
- (i) providing a plurality of semaphores for controlling access to respective shared resources, each node having a local copy of all the semaphores,
- (ii) providing a semaphore ownership table in each nodes, said semaphore ownership table defining ownership states for the semaphores whereby each semaphore may be unowned (i.e. not owned by any node), or owned by a particular node,
- (iii) in response to a request in a node for a semaphore operation on an unowned semaphore, sending a semaphore message over said communications network instructing all the nodes to perform the semaphore operation on their local copies of the semaphore, and then suspending the semaphore operation in this node until the semaphore message has been returned from said communications network,
- (iv) in response to a request in a node for a semaphore operation on a semaphore owned by this node, sending a semaphore message over said communications network instructing all the nodes to perform the semaphore operation on their local copies of the semaphore, and then permitting this node to proceed with the semaphore operation without waiting for the semaphore message to be returned from said communications network, and
- (v) in response to a request for a semaphore operation on a semaphore owned by another node, sending a semaphore message over said communications network instructing all the nodes to perform the semaphore operation on their local copies of the semaphore, and then suspending the semaphore operation until permission to proceed is received from that other node.

* * * * *